US008653179B2

(12) United States Patent
Jung et al.

(10) Patent No.: US 8,653,179 B2
(45) Date of Patent: Feb. 18, 2014

(54) POLYCARBONATE RESIN COMPOSITION WITH GOOD LIGHT STABILITY AND DIMENSIONAL STABILITY

(75) Inventors: Hyuk-Jin Jung, Gunpo-si (KR); Jong-Cheol Lim, Anyang-si (KR)

(73) Assignee: Cheil Industries Inc., Gumi-si (KR)

( * ) Notice: Subject to any disclaimer, the term of this patent is extended or adjusted under 35 U.S.C. 154(b) by 524 days.

(21) Appl. No.: 12/944,972

(22) Filed: Nov. 12, 2010

(65) Prior Publication Data
US 2011/0060084 A1 Mar. 10, 2011

Related U.S. Application Data

(63) Continuation-in-part of application No. PCT/KR2008/007905, filed on Dec. 31, 2008.

(30) Foreign Application Priority Data

May 15, 2008  (KR) .................. 10-2008-0045090

(51) Int. Cl.
*C08L 83/00* (2006.01)
(52) U.S. Cl.
USPC ............ 524/506; 524/508; 524/513; 524/520
(58) Field of Classification Search
USPC ................................... 524/506, 508, 513, 520
See application file for complete search history.

(56) References Cited

U.S. PATENT DOCUMENTS

| | | | |
|---|---|---|---|
| 2,999,846 A | 9/1961 | Schnell et al. |
| 3,028,365 A | 4/1962 | Schnell et al. |
| 3,271,367 A | 9/1966 | Schnell et al. |
| 4,335,032 A | 6/1982 | Rosenquist |
| 4,452,968 A | 6/1984 | Bolon et al. |
| 5,116,905 A | 5/1992 | Belfoure et al. |
| 5,266,618 A | 11/1993 | Watanabe et al. |
| 5,391,648 A | 2/1995 | Yamamoto et al. |
| 5,449,710 A | 9/1995 | Umeda et al. |
| 5,837,757 A | 11/1998 | Nodera et al. |
| 5,902,539 A | 5/1999 | Schmidt et al. |
| 6,063,844 A | 5/2000 | Barren et al. |
| 6,184,312 B1 | 2/2001 | Yamamoto et al. |
| 6,194,536 B1 | 2/2001 | Schmidt et al. |
| 6,197,857 B1 | 3/2001 | Nodera et al. |
| 6,518,357 B1 | 2/2003 | Rajagopalan et al. |
| 6,548,624 B2 | 4/2003 | Mitsuta et al. |
| 6,602,938 B1 | 8/2003 | Iji et al. |
| 6,664,313 B2 | 12/2003 | Hirai et al. |
| 6,716,952 B1 | 4/2004 | Matsumoto et al. |
| 6,790,887 B1 | 9/2004 | Nishihara |
| 6,838,502 B1 | 1/2005 | Nodera et al. |
| 7,001,945 B2 | 2/2006 | Nodera et al. |
| 7,060,780 B2 | 6/2006 | Miyamoto et al. |
| 7,115,677 B2 | 10/2006 | Harashina et al. |
| 7,183,342 B2 | 2/2007 | Miyamoto et al. |
| 7,786,196 B2 | 8/2010 | Jung et al. |
| 7,939,591 B2 | 5/2011 | Tomoda |
| 2002/0055563 A1 | 5/2002 | Asano et al. |
| 2002/0146550 A1 | 10/2002 | Hirai et al. |
| 2003/0181573 A1 | 9/2003 | Miyatake et al. |
| 2004/0220302 A1 | 11/2004 | Saegusa et al. |
| 2004/0249072 A1 | 12/2004 | Warth et al. |
| 2004/0260035 A1 | 12/2004 | Dairanieh et al. |
| 2004/0266916 A1 | 12/2004 | Harashina et al. |
| 2005/0143532 A1 | 6/2005 | Fonseca et al. |
| 2005/0245670 A1 | 11/2005 | Sato |
| 2005/0286397 A1 | 12/2005 | Inagaki |
| 2006/0052519 A1 | 3/2006 | Nodera et al. |
| 2007/0072960 A1 | 3/2007 | Ma et al. |
| 2007/0191518 A1 | 8/2007 | Chen et al. |
| 2007/0208128 A1 | 9/2007 | Jung et al. |
| 2008/0004373 A1* | 1/2008 | Volkers et al. ................ 523/200 |
| 2008/0076866 A1 | 3/2008 | Mitsuhashi et al. |
| 2009/0239975 A1 | 9/2009 | Jung et al. |
| 2009/0306275 A1 | 12/2009 | Inagaki |
| 2010/0157217 A1 | 6/2010 | Kim et al. |
| 2011/0060084 A1 | 3/2011 | Jung et al. |
| 2011/0306712 A1 | 12/2011 | Inagaki |

FOREIGN PATENT DOCUMENTS

| | | |
|---|---|---|
| JP | 1972-40445 | 4/1972 |
| JP | 1985-38418 | 2/1985 |
| JP | 09-012853 A | 1/1997 |
| JP | 2003-213114 A | 7/2003 |
| JP | 3871307 | 10/2006 |
| KR | 10-2005-0120238 | 12/2005 |
| KR | 10-0575258 B1 | 4/2006 |
| KR | 10-0782265 B1 | 11/2007 |
| KR | 10-0804173 B1 | 2/2008 |
| KR | 10-2008-0062503 | 7/2008 |
| WO | 98/24844 A1 | 6/1998 |
| WO | 2007/078035 A1 | 7/2007 |
| WO | 2008/082202 A1 | 7/2008 |
| WO | 2009/139535 A1 | 11/2009 |

OTHER PUBLICATIONS

European Search Report in commonly owned European Application Serial No. 08874296.0 mailed Aug. 2, 2012, pp. 1-6.

(Continued)

*Primary Examiner* — Peter D Mulcahy
(74) *Attorney, Agent, or Firm* — Additon, Higgins, Pendleton & Ashe, P.A.

(57) ABSTRACT

The present invention relates to a polycarbonate resin composition that can have excellent light stability and dimensional stability, including: (A) 70 to 95 parts by weight of a thermoplastic polycarbonate resin; (B) 5 to 40 parts by weight of a thermoplastic non-crystalline polyester copolymer; (C) 5 to 50 parts by weight of titanium dioxide; (D) 0.1 to 10 parts by weight of an organic siloxane copolymer; and (E) 0.05 to 5 parts by weight of a fluorinated polyolefin-based resin. The polycarbonate resin composition can have excellent light stability and dimensional stability and also can have excellent mechanical strength without reduced impact strength and workability. The polycarbonate resin composition can be used in molded products such as LCD backlight parts requiring product dimensional stability and other parts requiring light stability.

15 Claims, 1 Drawing Sheet

(56) References Cited

OTHER PUBLICATIONS

Office Action in commonly owned U.S. Appl. No. 12/633,081 mailed Oct. 27, 2011, pp. 1-14.
Taiwanese Office Action in commonly owned Taiwanese Application No. 096151464 mailed Sep. 19, 2011, pp. 1-6.
English Translation of Taiwanese Office Action in commonly owned Taiwanese Application No. 096151464 mailed Sep. 19, 2011, pp. 1-5.
International Search Report in counterpart International Application No. PCT/KR2008/007905 dated Aug. 12, 2009.
Final Office Action in commonly owned U.S. Appl. No. 12/478,867 mailed Apr. 19, 2011, pp. 1-11.
Advisory Action in commonly owned U.S. Appl. No. 12/478,867 mailed Jul. 28, 2011, pp. 1-6.
Office Action in commonly owned U.S. Appl. No. 12/478,867 mailed Dec. 14, 2011, pp. 1-18.
International Search Report and Written Opinion in commonly owned International Application No. PCT/KR2007/006967, mailed on Jan. 21, 2008.
Office Action in commonly owned U.S. Appl. No. 12/478,867 dated Nov. 22, 2010.
European Search Report in commonly owned European Application No. 11195315.4 date May 10, 2012, pp. 1-5.
Database WPI, Abstract for Korean Publication No. 2005-0120238, Thomson Scientific, London, GB, dated May 4, 2012, pp. 1.
Final Office Action in commonly owned U.S. Appl. No. 12/478,867 mailed May 8, 2012, pp. 1-14.
Advisory Action in commonly owned U.S. Appl. No. 12/478,867 mailed Nov. 8, 2012, pp. 1-10.

* cited by examiner

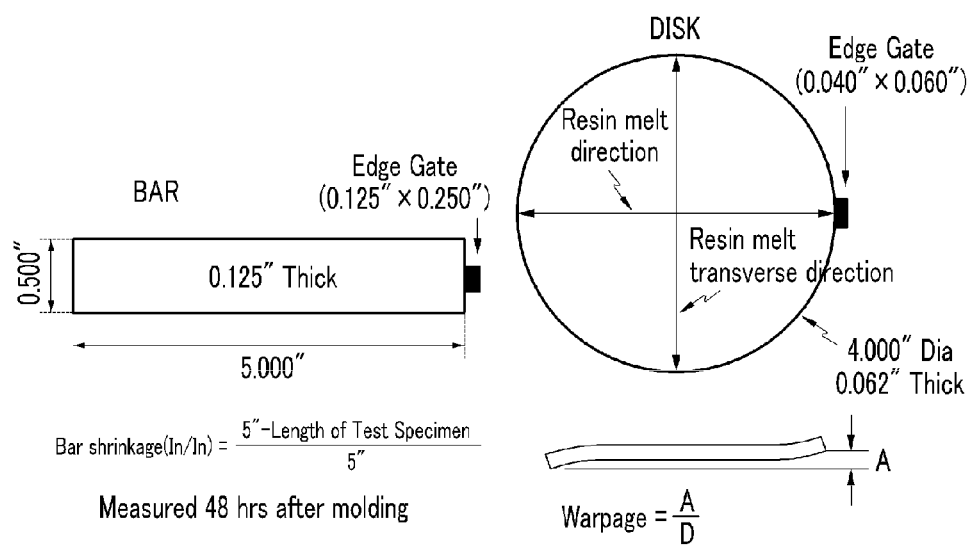

POLYCARBONATE RESIN COMPOSITION WITH GOOD LIGHT STABILITY AND DIMENSIONAL STABILITY

CROSS REFERENCE TO RELATED APPLICATIONS

This application is a continuation-in-part of International Application No. PCT/KR2008/007905, filed Dec. 31, 2008, pending, which designates the U.S., published as WO 2009/139535, and is incorporated herein by reference in its entirety, and claims priority therefrom under 35 USC Section 120. This application also claims priority under 35 USC Section 119 from Korean Patent Application No. 10-2008-0045090, filed May 15, 2008, in the Korean Intellectual Property Office, the entire disclosure of which is also incorporated herein by reference.

FIELD OF THE INVENTION

The present invention relates to a polycarbonate resin composition that can have good light stability and excellent dimensional stability. More particularly, the present invention relates to a polycarbonate resin composition that can have good light stability and excellent dimensional stability without reduction of impact strength and flame retardancy.

BACKGROUND OF THE INVENTION

Polycarbonate resin is an engineering plastic having excellent mechanical strength, high heat resistance, transparency, and the like, and accordingly it has been widely used in various fields such as office automation devices, electric/electronic parts, construction materials, and the like. The resin used in LCD (liquid crystal display) back-light parts requires high reflectivity, light stability, color fixation, and the like, and further requires high fluidity as devices such as televisions, monitors, laptops, and the like are becoming slimmer and thinner.

When a polycarbonate resin is used in LCD back-light parts, the resin is generally colored with high whiteness and used in a back-light frame in order to minimize backlight loss. The white pigment for coloring the resin with high whiteness usually includes titanium dioxide ($TiO_2$) having the highest reflectivity in air.

Conventionally a halogen-based flame retardant and an antimony compound or phosphorus compound are added to a resin composition to impart flame retardancy thereto. However, the halogen-based flame retardant can generate a harmful gas during combustion. Representative phosphorous flame retardants include phosphate ester-based flame retardants. These phosphorous flame retardants, however, can cause a "juicing" phenomenon in which the flame retardant migrates to and deposits on the surface of a molded product during a molding process, and the heat resistance of the resin composition can be significantly decreased.

In order to provide high heat resistance and flame retardancy without using a halogen-based flame retardant, a common technique uses a sulfonic acid metal salt. This technique, however, can deteriorate flame retardancy. Further, the resin can decompose at a high temperature when a large amount of titanium dioxide is used for coloring to provide a high whiteness, so that the mechanical properties of the resin composition can also deteriorate.

Japanese Patent Publication No. 1997-012853 discloses a flame retardant resin composition composed of a polycarbonate, titanium dioxide, a polyorganosiloxane-polyalkyl acrylate combined rubber, a halogen-based and phosphate ester-based flame retardant, and a fluorinated polyolefin-based resin, and U.S. Pat. No. 5,837,757 discloses a flame retardant resin composition composed of a polycarbonate, titanium dioxide, a stilbene-bisbenzoxazole derivative, a phosphate ester-based flame retardant, polyorganosiloxane, and a fluorinated polyolefin-based resin. When these compositions are exposed to a light source for the long time, however, the halogen-based and phosphate ester-based flame retardant can accelerate decomposition of the resin composition to generate significant yellowing, which can deteriorate reflectivity.

U.S. Pat. No. 6,664,313 discloses a flame retardant resin composition composed of a polycarbonate, titanium dioxide, silica, polyorganosiloxane, and a fluorinated polyolefin-based resin. However, since silica is used as a flame retardant, the impact strength of the composition can deteriorate, and the appearance of the injection molded product can also deteriorate.

SUMMARY OF THE INVENTION

One embodiment of the present invention provides a polycarbonate resin composition that can have high light stability and excellent dimensional stability without reduction of impact strength and flame retardancy.

Another embodiment of the present invention provides a thermoplastic resin composition that can have excellent impact resistance, heat resistance, flame retardancy, workability, appearance, and the like, and thus can exhibit improved balance of properties.

A further embodiment of the present invention provides a molded product made using the polycarbonate resin composition.

The embodiments of the present invention are not limited to the above technical purposes, and a person of ordinary skill in the art can understand other technical purposes.

According to one embodiment of the present invention, a composition having light stability and dimensional stability is provided that includes (A) 70 to 95 parts by weight of a thermoplastic polycarbonate resin; (B) 5 to 40 parts by weight of a thermoplastic non-crystalline polyester copolymer; (C) 5 to 50 parts by weight of titanium dioxide; (D) 0.1 to 10 parts by weight of an organic siloxane copolymer; and (E) 0.05 to 5 parts by weight of a fluorinated polyolefin-based resin.

When titanium dioxide, an organic siloxane copolymer, and a fluorinated polyolefin-based resin are added to the polycarbonate resin and non-crystalline polyester copolymer, it is possible to obtain a composition having excellent light stability and dimensional stability without reduction of impact resistance, flame retardancy, and the like of the resin.

According to another embodiment of the present invention, a molded product made using the polycarbonate resin composition is provided.

Hereinafter, further embodiments of the present invention will be described in detail.

The polycarbonate resin composition having excellent light stability and dimensional stability can have excellent mechanical strength without reduction of impact strength and workability. The composition of the invention accordingly can be useful in a variety of molded products such as LCD back-light parts requiring fine dimensional stability or other parts requiring light stability.

BRIEF DESCRIPTION OF THE DRAWING

FIG. 1 shows a method of measuring dimensional stability.

DETAILED DESCRIPTION OF THE INVENTION

The present invention now will be described more fully hereinafter in the following detailed description of the invention and with reference to the accompanying drawing, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the terms "substituted alkyl", "substituted alkylene", "substituted alkylidene", "substituted cycloalkylene", "substituted cycloalkylidene", "substituted aryl", and "substituted arylene" independently refer to alkyl, alkylene, alkylidene, cycloalkylene, cycloalkylidene, aryl, and arylene substituted with one or more of a halogen, C1 to C30 alkyl, C6 to C30 aryl, C2 to C30 heteroaryl, or C1 to C20 alkoxy.

As used herein, when a specific definition is not otherwise provided, the term "alkyl" refers to C1 to C20 alkyl, the term "alkylene" refers to C1 to C20 alkylene, the term "aryl" refers to C6 to C30 aryl, the term "alkoxy" refers to C1 to C20 alkoxy, the term "alkenyl" refers to C1 to C20 alkenyl, the term "cycloalkane" refers to C3 to C20 cycloalkane, the term "alkylidene" refers to C1 to C20 alkylidene, the term "cycloalkylene" refers to C3 to C20 cycloalkylene, the term "cycloalkylidene" refers to C3 to C20 cycloalkylidene, and the term "arylene" refers to C6 to C30 arylene.

As used herein, when a specific definition is not otherwise provided, the term "hetero" refers to a group substituted with one or more heteroatoms such as one or more of N, O, S, or P, or a combination thereof.

The polycarbonate resin composition that can have excellent light stability and dimensional stability according to one embodiment of the present invention includes (A) 70 to 95 parts by weight of a thermoplastic polycarbonate resin; (B) 5 to 40 parts by weight of a thermoplastic non-crystalline polyester copolymer; (C) 5 to 50 parts by weight of titanium dioxide; (D) 0.1 to 10 parts by weight of an organic siloxane copolymer; and (E) 0.05 to 5 parts by weight of a fluorinated polyolefin-based resin.

Each component included in the polycarbonate resin composition having excellent light stability and dimensional stability according to embodiments of the present invention will hereinafter be described in detail.

(A) Polycarbonate Resin

The polycarbonate resin used in the resin composition is an aromatic polycarbonate resin that is prepared by reacting one or more diphenols of the following Chemical Formula 1 with a compound of phosgene, halogen formate, or carbonate.

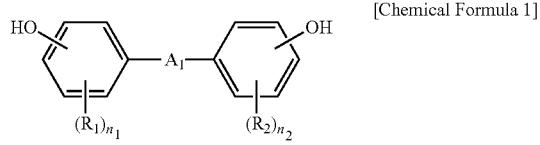

[Chemical Formula 1]

In the above Chemical Formula 1, $A_1$ is a single bond, substituted or unsubstituted C1 to C5 alkylene, substituted or unsubstituted C1 to C5 alkylidene, substituted or unsubstituted C3 to C6 cycloalkylene, substituted or unsubstituted C5 to C6 cycloalkylidene, CO, S, or SO2, $R_1$ and $R_2$ are each independently substituted or unsubstituted C1 to C30 alkyl or substituted or unsubstituted C6 to C30 aryl, and $n_1$ and $n_2$ are each independently integers ranging from 0 to 4.

As used herein with reference to Chemical Formula 1, the term "substituted" refers to one substituted with one or more substituents selected from the group consisting of halogen, C1 to C30 alkyl, C1 to C30 haloalkyl, C6 to C30 aryl, C2 to C30 heteroaryl, C1 to C20 alkoxy, and combinations thereof.

The diphenols represented by the above Chemical Formula 1 may be used in combinations to constitute repeating units of the polycarbonate resin. Specific examples of the diphenols include without limitation hydroquinone, resorcinol, 4,4'-dihydroxydiphenyl, 2,2-bis(4-hydroxyphenyl)-propane, 2,4-bis(4-hydroxyphenyl)-2-methylbutane, 1,1-bis(4-hydroxyphenyl)-cyclohexane, 2,2-bis(3-chloro-4-hydroxyphenyl)-propane, 2,2-bis(3,5-dichloro-4-hydroxyphenyl)-propane, and the like, and combinations thereof. In exemplary embodiments, the diphenols can include 2,2-bis(4-hydroxyphenyl)-propane, 2,2-bis(3,5-dichloro-4-hydroxyphenyl)-propane, or 1,1-bis(4-hydroxyphenyl)-cyclohexane. In exemplary embodiments, the diphenol can be 2,2-bis(4-hydroxyphenyl)-propane (referred to as "bisphenol-A"). The polycarbonate resin can have a weight average molecular weight ranging from 10,000 to 200,000, for example, a weight average molecular weight ranging from 15,000 to 80,000, but the weight average molecular weight thereof is not limited thereto.

The polycarbonate resin may be a copolymer prepared from a mixture of two or more different diphenols. The polycarbonate resin may also be a linear polycarbonate resin, a branched polycarbonate resin, a polyestercarbonate copolymer, and the like, or a combination thereof.

The linear polycarbonate resin may include a bisphenol-A-based polycarbonate resin. The branched polycarbonate resin may include one produced by reacting a multi-functional aromatic compound such as trimellitic anhydride, trimellitic acid, and the like with diphenols and a carbonate. The multi-functional aromatic compound may be included in an amount of 0.05 to 2 mol % based on the total weight of the branched polycarbonate resin. The polyester carbonate copolymer resin may be prepared by reacting a difunctional carboxylic acid with diphenols and a carbonate. The carbonate may include a diaryl carbonate such as diphenyl carbonate, and ethylene carbonate.

The polycarbonate resin composition of the invention may include the polycarbonate resin in an amount of 70 to 95 parts by weight, based on the total weight of the polycarbonate resin composition. In some embodiments, the polycarbonate resin may be used in an amount of 70, 71, 72, 73, 74, 75, 76, 77, 78, 79, 80, 81, 82, 83, 84, 85, 86, 87, 88, 89, 90, 91, 92, 93, 94, or 95 parts by weight. Further, according to some embodiments of the present invention, the amount of the polycarbonate resin can be in a range from any of the foregoing amounts to any other of the foregoing amounts. When the polycarbonate is included in an amount within the above range, the resin can have an excellent balance of properties such as impact resistance, heat resistance, flame retardancy, workability, appearance, and the like.

(B) Thermoplastic Non-Crystalline Polyester Copolymer

The thermoplastic non-crystalline (amorphous) polyester copolymer (B) of the polycarbonate resin composition according to present invention is a non-crystalline polyalkylene terephthalate copolymer that is prepared using a cycloalkane dialcohol represented by the following Chemical Formula 2 as a copolymerization component. The polyester copolymer is prepared by partially substituting an alkylene glycol component of the polyalkylene terephthalate resin with the cycloalkane dialcohol represented by the following Chemical Formula 2.

$$HO—(R_3)n_3\text{-}A_2\text{-}(R_4)n_4\text{-}OH \qquad \text{[Chemical Formula 2]}$$

In the above Chemical Formula 2, $A_2$ is cycloalkylene, $R_3$ and $R_4$ are independently substituted or unsubstituted alkylene, and $n_3$ and $n_4$ are independently integers ranging from 1 to 4.

For example, the polyester copolymer may include a copolymer in which the ethylene glycol component of a polyethylene terephthalate resin is partially substituted with 1,4-cyclohexane dimethanol (CHDM) represented by the following Chemical Formula 3.

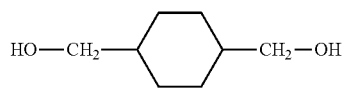
[Chemical Formula 3]

The thermoplastic non-crystalline polyester copolymer may include a polyester copolymer resin in which 3 to 48 mol %, for example 5 to 20 mol %, of the alkylene glycol component of a polyethylene terephthalate resin is substituted with a cycloalkane dialcohol. When the polyethylene terephthalate resin includes the cycloalkane dialcohol in an amount of less than 3 mol %, it may not provide significantly improved dimensional stability of the thermoplastic resin composition; on the other hand, when the polyethylene terephthalate resin includes the cycloalkane dialcohol in an amount of more than 48 mol %, heat resistance of the thermoplastic resin composition can deteriorate.

According to one embodiment, the polycarbonate resin composition of the invention can include the non-crystalline polyester copolymer (B) in an amount from 5 to 40 parts by weight, for example from 10 to 30 parts by weight, based on the total weight of the polycarbonate resin composition. In some embodiments, the non-crystalline polyester copolymer may be used in an amount of 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments of the present invention, the amount of the non-crystalline polyester copolymer can be in a range from any of the foregoing amounts to any other of the foregoing amounts. When the non-crystalline polyester copolymer is used in an amount of less than 5 parts by weight, the light stability can deteriorate; on the other hand, when the non-crystalline polyester copolymer is used in an amount of more than 40 parts by weight, the impact resistance and flame retardancy can deteriorate.

(C) Titanium Dioxide

Titanium dioxide according to the present invention may include any conventional titanium dioxide, and the manufacturing method and the particle diameter thereof are not limited. The titanium dioxide can be surface-treated with an inorganic surface treatment agent or an organic surface treatment agent.

Exemplary inorganic surface treatment agents include without limitation aluminum oxide (alumina, $Al_2O_3$), silicon dioxide (silica, $SiO_2$), zirconia (zirconium dioxide, $ZrO_2$), sodium silicate, sodium aluminate, sodium aluminum silicate, zinc oxide, mica, and the like, and combinations thereof.

Exemplary organic surface treatment agents include without limitation polydimethyl siloxane, trimethyl propane (TMP), pentaerythritol, and the like, and combinations thereof.

The inorganic or organic surface treatment agent can be used in an amount of about 0.3 or less parts by weight based on 100 parts by weight of titanium dioxide. According to one embodiment, the titanium dioxide can be surface-treated with an inorganic and/or organic surface treatment agent in an amount of 0.001 to 0.3 parts by weight.

In one embodiment, the titanium dioxide can include an inorganic surface treatment agent of alumina ($Al_2O_3$) coated on a surface thereof in an amount of 2 parts by weight or less based on 100 parts by weight of the titanium dioxide.

The titanium dioxide that is surface-treated with alumina may further be modified with an inorganic surface treatment agent such as silicon dioxide, zirconium dioxide, sodium silicate, sodium aluminate, sodium aluminum silicate, mica, and the like, and combinations thereof; or an organic surface treatment agent such as polydimethyl siloxane, trimethyl propane (TMP), pentaerythritol, and the like, and combinations thereof.

According to one embodiment, the polycarbonate resin composition of the invention can include the titanium dioxide (C) in an amount of 5 to 50 parts by weight, for example 10 to 30 parts by weight, based on the total weight of the polycarbonate resin composition. In some embodiments, the titanium dioxide may be used in an amount of 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of the titanium dioxide can be in a range from any of the foregoing amounts to any other of the foregoing amounts. When the titanium dioxide is used in an amount of less than 5 parts by weight, the light stability can deteriorate; on the other hand, when the titanium dioxide is used in an amount of more than 50 parts by weight, the impact resistance can deteriorate.

(D) Organic Siloxane Copolymer

The organic siloxane copolymer (D) can be represented by the following Chemical Formula 4.

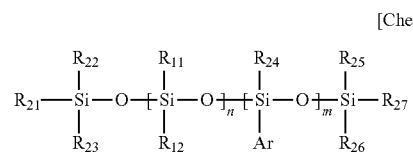
[Chemical Formula 4]

In the above Chemical Formula 4, $R_{11}$ and $R_{12}$ are independently alkyl or aryl, $R_{21}$ to $R_{27}$ are independently alkyl, aryl, hydroxy, alkoxy, aryloxy, or alkenyl, Ar is aryl, and n and m are integers representing a repeating unit. The organic siloxane copolymer can be prepared by mixing copolymers having different n and m values to provide an average n:m ratio of between 9:1 and 3:7 and an n+m range of 1 to 500.

An exemplary organic siloxane copolymer includes a phenyl-substituted siloxane copolymer represented by the following Chemical Formula 5.

[Chemical Formula 5]

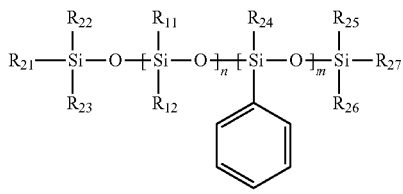

In the above Chemical Formula 5, $R_{11}$ and $R_{12}$ are independently methyl or phenyl, $R_{21}$ to $R_{27}$ are independently methyl, phenyl, hydroxy, methoxy, ethoxy, phenoxy, or vinyl, and n and m are the same as in the above Formula 4.

When the phenyl-substituted siloxane copolymer is used as an organic siloxane copolymer, it can provide excellent light stability and color fixation. Examples of the phenyl substituted siloxane copolymer include without limitation poly(m-ethylphenyl)siloxane, poly(diphenyl)siloxane, a dimethylsiloxane-diphenylsiloxane copolymer, a dimethylsiloxane-methylphenylsiloxane copolymer, and the like, and mixtures thereof.

In exemplary embodiments, the organic siloxane copolymer can have a dynamic viscosity ranging from 1 to 1000 mm²/S at 25° C., for example 4 to 500 mm²/S, which can provide advantages with regard to light stability and impact strength.

In one embodiment, the polycarbonate resin composition of the invention can include the organic siloxane copolymer in an amount of 0.1 to 10 parts by weight, based on the total weight of the polycarbonate resin composition. In some embodiments, the organic siloxane copolymer may be used in an amount of 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments of the present invention, the amount of the organic siloxane copolymer can be in a range from any of the foregoing amounts to any other of the foregoing amounts. When the organic siloxane copolymer is used in an amount of less than 0.1 parts by weight, the flame retardancy can deteriorate; on the other hand, when the organic siloxane copolymer is used in an amount of more than 10 parts by weight, the coloring property of the resin can deteriorate.

(E) Fluorinated Polyolefin-Based Resin

Exemplary fluorinated polyolefin-based resins (E) useful in the flame retardant thermoplastic resin composition of the present invention include without limitation polytetrafluoroethylene, polyvinylidenefluoride, a tetrafluoroethylene/vinylidenefluoride copolymer, a tetrafluoroethylene/hexafluoropropylene copolymer, an ethylene/tetrafluoroethylene copolymer, and the like. They may be used singly, or two or more thereof can be used together.

When the fluorinated polyolefin-based resin is mixed with the other components according to the present invention and extruded, it can form a fibrillar network in the resin. This can decrease fusion viscosity of the resin during combustion and increase shrinkage to prevent the resin from exhibiting the dripping phenomenon.

The fluorinated resin of the resin composition according to the present invention can be prepared by a known polymerization method. For example, it may be prepared in an aqueous media for forming a free radical such as sodium, potassium, or ammonium peroxydisulfate and the like under the conditions of a pressure of 7 to 71 kg/cm² and a temperature of 0 to 200° C., for example 20 to 100° C. The fluorinated polyolefin-based resin may be used in an emulsion state or a powder state. When the emulsion fluorinated polyolefin-based resin is used, the dispersion can be improved in the entire resin composition, but the manufacturing process can be complicated. Accordingly, a powder state of the fluorinated polyolefin-based resin can be suitable if it is appropriately dispersed in the entire resin composition to form the fibrillar network in the resin.

According to one embodiment, the fluorinated polyolefin-based resin can have a particle size of 0.05 to 1000 μm and a specific gravity of 1.2 to 2.3 g/cm³.

According to one embodiment, the polycarbonate resin composition of the invention can include the fluorinated polyolefin-based resin in an amount of 0.05 to 5 parts by weight, based on the total weight of the polycarbonate resin composition. In some embodiments, the fluorinated polyolefin-based resin may be used in an amount of 0.05, 0.06, 0.07, 0.08, 0.09, 0.1, 0.2, 0.3, 0.4, 0.5, 0.6, 0.7, 0.8, 0.9, 1, 2, 3, 4, or 5 parts by weight. Further, according to some embodiments of the present invention, the amount of the fluorinated polyolefin-based resin can be in a range from any of the foregoing amounts to any other of the foregoing amounts. When the fluorinated polyolefin-based resin is added in an amount within this range, the balance of flame retardancy and mechanical properties can be improved.

(F) Other Additive(s)

The polycarbonate resin composition of the invention that can have excellent light stability and dimensional stability can further optionally include one or more additives such as but not limited to ultraviolet (UV) stabilizers, fluorescent whitening agents, lubricants, release agents, nucleating agents, antistatic agents, stabilizers, reinforcing materials, inorganic material additives, pigments, dyes, and the like, and combinations thereof, along with the above (A) to (D) components, as needed.

The ultraviolet (UV) stabilizer plays a role of inhibiting the color change of the resin composition and reflectivity deterioration by the UV irradiation. Exemplary ultraviolet stabilizers include without limitation benzotriazole-based compounds, benzophenone-based compounds, triazine-based compounds, and the like, and combinations thereof.

The fluorescent whitening agent plays a role of improving the reflectivity of the polycarbonate resin composition. Exemplary fluorescent whitening agents include without limitation tilbene-bisbenzo oxazole derivatives such as 4-(benzoxazol-2-yl)-4'-(5-methylbenzoxazol-2-yl)stilbene, 4,4'-bis(benzoxazol-2-yl)stilbene, and the like, and combinations thereof.

Exemplary release agents may include without limitation fluorine-containing polymers, silicone oils, metal salts of stearic acid, metal salts of montanic acid, montanate ester waxes, polyethylene waxes, and the like, and combinations thereof.

Exemplary nucleating agents may include without limitation talc, clay, and the like, and combinations thereof.

Exemplary inorganic additives may include without limitation glass fiber, silica, clay, calcium carbonate, calcium sulfate, glass beads, and the like, and combinations thereof.

The additive(s) may be used in an amount up to 60 parts by weight based on 100 parts by weight of the thermoplastic polycarbonate resin (A), for example 1 to 40 parts by weight. In some embodiments, the additive(s) may be used in an amount of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 parts by weight. Further, according to some embodiments of the present invention, the amount of the additive(s) can be in a range from any of the foregoing amounts to any other of the foregoing amounts. When the additive(s) are added in an amount within these ranges, it is possible to provide a suitable balance of physical properties.

The resin composition may be prepared in accordance with any conventional method known for manufacturing a resin composition. For example, the components of the polycarbonate resin composition of the present invention and optional additive(s) can be simultaneously mixed and melt-extruded in an extruder to provide the composition in pellet form. The pellets may be subject to conventional molding processes, such as but not limited to extrusion molding, injection molding, and the like, to form a product.

The polycarbonate resin composition can be useful for the production of various molded products, including various electric-electronic devices such as back-light parts for liquid crystal display devices, televisions, monitors, laptops, and the like.

EXAMPLES

Hereinafter, the present invention is illustrated in more detail with reference to examples. However, the embodiments of the present invention are exemplary, and the present invention is not limited thereto.

(A) Thermoplastic Polycarbonate Resin

The polycarbonate resin of the examples and comparative examples is PANLITE L-1250WP, manufactured by Japan Teijin, which is a bisphenol-A polycarbonate having a weight average molecular weight of 25,000 g/mol.

(B) Polyester Resin (B-1) Thermoplastic Non-Crystalline Polyester Copolymer

The non-crystalline polyester copolymer used in the examples and comparative examples is SKY PET BR8040, manufactured by Korea SK Chemicals, which is a non-crystalline polyethylene terephthalate copolymer having a copolymer component of 1,4-cyclohexane dimethanol. The non-crystalline polyethylene terephthalate copolymer includes 3 to 48 mol % of the 1,4-cyclohexane dimethanol and the intrinsic viscosity [η] is 0.8 dl/g at 25° C. in an o-chloro phenol solvent.

(B-2) Polyethylene Terephthalate Homopolymer

The polyethylene terephthalate homopolymer used in the comparative examples is ANYPET 1100, manufactured by Korea Anychem, which has an intrinsic viscosity [η] of 1.6 dl/g.

(C) Titanium Dioxide

Titanium dioxide used in the examples of the present invention and the comparative examples is TIPURE PCX-02, manufactured by US Dupont.

(D) Flame retardant (D-1) An organic siloxane polymer (D-1) used in the examples of the present invention and the comparative examples is TSF-433 polymethyl phenylsiloxane, manufactured by GE-Toshiba Silicon.

(D-2) A bisphenol-A derived oligomer phosphate ester-based flame retardant (D-2) used in the comparative examples is CR-741, manufactured by Japan Daihachi.

(D-3) A resorcinol derived oligomer phosphate ester-based flame retardant (D-3) used in the comparative examples is PX-200, manufactured by Japan Daihachi.

(D-4) A metal salt sulfonate-based flame retardant (D-4) used in the comparative examples is FR-2025, manufactured by US 3M.

(E) Fluorinated Polyolefin-Based Resin

TEFLON (tetrafluoroethylene) (trade name) 850-A manufactured by US 3M is used as a fluorinated polyolefin-based resin.

Examples 1 and 2 and Comparative Examples 1 to 6

The above-mentioned components are mixed in a general mixer in accordance with the composition ratios shown in the following Table 1 and extruded by a twin screw extruder of L/D=35, φ=45 mm, to provide a pellet extruded product.

Specimens are prepared from the obtained pellets using a 10 oz extruder at an injection temperature of 280 to 300° C. to determine physical properties and flame retardancy.

TABLE 1

| | | | Examples | | Comparative Examples (unit: parts by weight) | | | | | |
|---|---|---|---|---|---|---|---|---|---|---|
| | | | 1 | 2 | 1 | 2 | 3 | 4 | 5 | 6 |
| (A) polycarbonate resin | | | 80 | 70 | 100 | 70 | 80 | 80 | 80 | 30 |
| (B) polyester resin | B-1 | | 20 | 30 | — | — | 20 | 20 | 20 | 70 |
| | B-2 | | — | — | — | 30 | — | — | — | — |
| (C) titanium dioxide | | | 20 | 20 | 20 | 20 | — | — | — | 20 |
| (D) flame retardant | D-1 | | 2 | 3 | 2 | — | — | — | — | 3 |
| | D-2 | | — | — | — | — | 7 | — | — | — |
| | D-3 | | — | — | — | — | — | 5 | — | — |
| | D-4 | | — | — | — | — | — | — | 0.1 | — |
| (E) fluorinated polyolefin-based resin | | | 0.5 | 0.5 | 0.5 | 0.5 | 0.5 | 0.5 | 0.5 | 0.5 |

The obtained specimens are allowed to stand at 23° C. and relative humidity of 50% for 48 hours, and physical properties are measured in accordance with the following methods. The results are shown in the following Table 2.

(1) Dimensional stability: determined by measuring resin melt direction (MD) shrinkage of ASTM D955 standard bar specimen, and resin melt direction warpage and resin melt transverse direction warpage of a disk specimen.

(2) Light stability: determined by measuring Yellow index with a Minolta 3600D CIE Lab. Colorimeter before and after ultraviolet irradiation with an ASTM G53 standard UV-Condensation machine.

(3) Flame retardancy: measured using a 2.0 mm thick specimen in accordance with the UL-94 standard.

(4) Notch Izod impact strength: measured for a ⅛" specimen in accordance with the ASTM D256 standard.

(5) Heat resistance: Vicat softening temperature is measured in accordance with the ASTM D1525 standard.

TABLE 2

|  |  | Examples | | Comparative Examples | | | | | |
|---|---|---|---|---|---|---|---|---|---|
|  |  | 1 | 2 | 1 | 2 | 3 | 4 | 5 | 6 |
| dimensional stability | Bar MD Shrinkage | 0.54 | 0.55 | 0.53 | 0.87 | 0.49 | 0.52 | 0.53 | 0.72 |
|  | Disk MD Warpage | 0.48 | 0.50 | 0.46 | 0.79 | 0.42 | 0.43 | 0.45 | 0.69 |
|  | Disk TD Warpage | 0.52 | 0.53 | 0.51 | 0.85 | 0.47 | 0.50 | 0.51 | 0.65 |
| light stability (yellow index) | Before ultraviolet (UV) radiation | 2.4 | 2.1 | 3.6 | 2.8 | 2.6 | 2.5 | 2.5 | 0.9 |
|  | After ultraviolet (UV) radiation for 72 hours | 22.1 | 19.6 | 27.0 | 23.5 | 31.1 | 30.4 | 27.9 | 16.2 |
|  | Yellow index difference | 19.7 | 17.5 | 23.4 | 20.7 | 28.5 | 27.9 | 25.4 | 15.3 |
| UL94 flame retardancy | 2.0 mm specimen | V-0 | V-0 | V-0 | V-2 | V-1 | V-1 | Fail | Fail |
|  | Total combustion time (second) | 27 | 36 | 27 | 95 | 67 | 64 | — | — |
| 1/8" IZOD impact strength (kgf·cm/cm) | | 32 | 30 | 37 | 16 | 13 | 15 | 17 | 5 |
| Vicat softening temperature (° C.) | | 135 | 132 | 141 | 127 | 108 | 110 | 135 | 115 |

As shown in Table 2, Comparative Example 1, which does not include component (B), exhibits excellent dimensional stability, flame retardancy, impact strength, and heat resistance, but it also exhibits significantly deteriorated light stability.

Comparative Example 2, which is the same composition as Example 2, except that component (B-2) is used instead of a non-crystalline polyester copolymer, exhibits good light stability, but also exhibits significantly deteriorated dimensional stability, flame retardancy, and impact strength.

Comparative Examples 3, 4, and 5 have the same composition as Example 1, except that components (D-2), (D-3), and (D-4) are used instead of the flame retardant (D-1). From the results of Table 2, compared to those of Example 1, Comparative Examples 3 and 4 exhibit good dimensional stability but also exhibit significantly deteriorated light stability, flame retardancy, impact strength, and heat resistance. In addition, Comparative Example 5 exhibits good dimensional stability and heat resistance but also exhibits significantly deteriorated flame retardancy and impact strength.

Comparative Example 6 includes components (A) and (B) in amounts outside the amounts of the present invention. From the results of Table 2, Comparative Example 7 exhibits significantly deteriorated dimensional stability, flame retardancy, impact strength, and heat resistance.

As shown in Table 2, when a polycarbonate resin, a non-crystalline polyester copolymer, titanium dioxide, an organic siloxane copolymer, and a fluorinated polyolefin-based resin are appropriately added, the specimens can exhibit reduced color change without deteriorated dimensional stability, flame retardancy, IZOD impact strength, and heat resistance after irradiating the specimens with ultraviolet rays, as compared to specimens formed using polyethylene terephthalate, other flame retardants, and/or components of the composition of the present invention in amounts outside of the ranges in accordance with the invention.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A polycarbonate resin composition comprising:
   (A) 70 to 95 parts by weight of a thermoplastic polycarbonate resin;
   (B) 5 to 40 parts by weight of a thermoplastic non-crystalline polyester copolymer, wherein the polyester copolymer (B) is a polyalkylene terephthalate copolymer resin comprising an alkylene glycol component which is partially substituted with a cycloalkane dialcohol;
   (C) 5 to 50 parts by weight of titanium dioxide;
   (D) 0.1 to 10 parts by weight of an organic siloxane polymer; and
   (E) 0.05 to 5 parts by weight of a fluorinated polyolefin-based resin.

2. The polycarbonate resin composition of claim 1, wherein the polyester copolymer (B) is a polyalkylene terephthalate copolymer resin comprising an alkylene glycol component which is partially substituted by 3 to 48 mol % of a cycloalkane dialcohol represented by the following Chemical Formula 2:

HO—(R$_3$)$n_3$-A$_2$-(R$_4$)$n_4$-OH     [Chemical Formula 2]

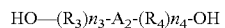

wherein, in the above Chemical Formula 2, A$_2$ is cycloalkylene, R$_3$ and R$_4$ are independently substituted or unsubstituted alkylene, and n3 and n4 are independently integers ranging from 1 to 4.

3. The polycarbonate resin composition of claim 2, wherein the polyester copolymer (B) is a polyalkylene terephthalate copolymer resin comprising an alkylene glycol component which is partially substituted by 5 to 20 mol % of a cycloalkane dialcohol represented by Chemical Formula 2.

4. The polycarbonate resin composition of claim 2, wherein polyester copolymer (B) is a polyethylene terephthalate copolymer resin comprising an ethylene glycol component which is partially substituted by 3 to 48 mol % of 1,4-cyclohexane dimethanol (CHDM) represented by the following Chemical Formula 3.

[Chemical Formula 3]

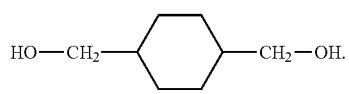

5. The polycarbonate resin composition of claim 1, comprising 10 to 30 parts by weight of said non-crystalline polyester copolymer (B).

6. The polycarbonate resin composition of claim 1, wherein the titanium dioxide is surface-treated with a surface treatment agent comprising an inorganic surface treatment agent, an organic surface treatment agent, or a combination thereof.

7. The polycarbonate resin composition of claim 6, wherein the inorganic surface treatment agent comprises silicon dioxide, zirconium dioxide, sodium silicate, sodium aluminate, sodium aluminum silicate, mica, or a combination thereof; the organic surface treatment agent comprises polydimethylsiloxane, trimethylpropane (TMP), pentaerythritol, or a combination thereof; and the titanium dioxide comprises said inorganic surface treatment agent, organic surface treatment agent, or combination thereof in an amount of 0.3 parts by weight or less based on 100 parts by weight of the titanium dioxide.

8. The polycarbonate resin composition of claim 1, comprising 10 to 30 parts by weight of said titanium dioxide (C).

9. The polycarbonate resin composition of claim 1, wherein the organic siloxane polymer (D) comprises a compound represented by the following Chemical Formula 4:

[Chemical Formula 4]

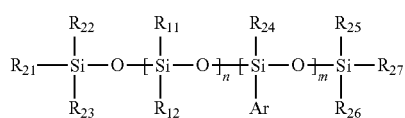

wherein, in the above Chemical Formula 4, $R_{11}$ and $R_{12}$ are independently alkyl or aryl, $R_{21}$ to $R_{27}$ are independently alkyl, aryl, hydroxy, alkoxy, aryloxy, or alkenyl, Ar is aryl, n and m are integers representing a repeating unit, and n+m ranges from 1 to 500.

10. The polycarbonate resin composition of claim 9, wherein the organic siloxane polymer (D) comprises a phenyl-substituted siloxane copolymer represented by the following Chemical Formula 5.

[Chemical Formula 5]

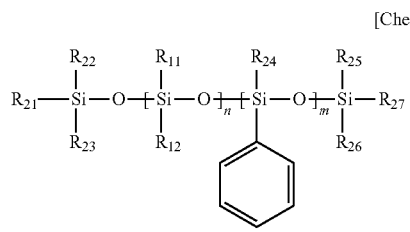

wherein $R_{11}$ and $R_{12}$ are independently methyl or phenyl, $R_{21}$ to $R_{27}$ are independently methyl, phenyl, hydroxy, methoxy, ethoxy, phenoxy, or vinyl, and n and m are the same as in Chemical Formula 4.

11. The polycarbonate resin composition of claim 9, wherein the organic siloxane polymer comprises poly(methylphenyl)siloxane, poly(diphenyl)siloxane, dimethylsiloxane-diphenylsiloxane, a dimethylsiloxane-methylphenylsiloxane copolymer, or a combination thereof.

12. The polycarbonate resin composition of claim 9, wherein the organic siloxane copolymer has a dynamic viscosity of 1 to 1000 $mm^2/S$ at 25° C.

13. The polycarbonate resin composition of claim 1, wherein the fluorinated polyolefin-based resin (E) comprises polytetrafluoroethylene, polyvinylidenefluoride, a tetrafluoroethylene/vinylidenefluoride copolymer, a tetrafluoroethylene/hexafluoropropylene copolymer, an ethylene/tetrafluoroethylene copolymer, or a mixture thereof.

14. The polycarbonate resin composition of claim 1, wherein the polycarbonate resin composition further comprises an additive comprising an ultraviolet (UV) stabilizer, a fluorescent whitening agent, a lubricant, a release agent, a nuclear agent, an antistatic agent, a stabilizer, a reinforcing material, an inorganic material additive, a pigment, a dye, or a mixture thereof in an amount of 60 parts by weight or less based on 100 parts by weight of the polycarbonate resin.

15. A molded product made using the polycarbonate resin composition according to claim 1.

* * * * *